United States Patent
Kline

(10) Patent No.: US 9,611,585 B2
(45) Date of Patent: Apr. 4, 2017

(54) METHOD AND APPARATUS FOR CURING OF PRE IMPREGNATED SYNTHETIC COMPONENTS IN SITU

(71) Applicant: Oceaneering International, Inc., Houston, TX (US)

(72) Inventor: Brett Howard Kline, Houston, TX (US)

(73) Assignee: Oceaneering International, Inc., Houston, TX (US)

(*) Notice: Subject to any disclaimer, the term of this patent is extended or adjusted under 35 U.S.C. 154(b) by 40 days.

(21) Appl. No.: 14/059,205

(22) Filed: Oct. 21, 2013

(65) Prior Publication Data
US 2014/0127439 A1    May 8, 2014

Related U.S. Application Data

(60) Provisional application No. 61/722,678, filed on Nov. 5, 2012.

(51) Int. Cl.
| | |
|---|---|
| *D07B 1/00* | (2006.01) |
| *B32B 1/08* | (2006.01) |
| *G02B 6/44* | (2006.01) |
| *D07B 1/14* | (2006.01) |
| *D07B 1/16* | (2006.01) |
| *B32B 27/12* | (2006.01) |

(Continued)

(52) U.S. Cl.
CPC ............... *D07B 1/00* (2013.01); *B32B 1/08* (2013.01); *B32B 27/12* (2013.01); *B32B 27/32* (2013.01); *D07B 1/147* (2013.01); *D07B 1/16* (2013.01); *G02B 6/4433* (2013.01); *B32B 2260/021* (2013.01); *B32B 2260/046* (2013.01); *B32B 2274/00* (2013.01); *B32B 2305/076* (2013.01); *D07B 2201/2046* (2013.01); *D07B 2201/2082* (2013.01); *D07B 2205/2042* (2013.01); *D07B 2207/4068* (2013.01); *D07B 2401/205* (2013.01); *H01B 7/045* (2013.01); *Y10T 428/1393* (2015.01); *Y10T 428/2967* (2015.01)

(58) Field of Classification Search
CPC . D07B 1/00; D07B 1/147; D07B 1/16; D07B 2201/2046; D07B 2201/2082; D07B 2205/2042; D07B 2207/4068; D07B 2401/205; B32B 1/08; B32B 27/12; B32B 27/32; B32B 2260/021; B32B 2260/046; B32B 2274/00; B32B 2305/076; Y10T 428/1393; Y10T 428/2967; H01B 7/045
See application file for complete search history.

(56) References Cited

U.S. PATENT DOCUMENTS

| | | |
|---|---|---|
| 5,138,684 A | 8/1992 | Bullock et al. |
| 2002/0121388 A1 | 9/2002 | Booth et al. |

(Continued)

*Primary Examiner* — Michael C Miggins
(74) *Attorney, Agent, or Firm* — Maze IP Law, PC

(57) ABSTRACT

A cable, which may be produced by the method described herein, comprises a cable with a core jacket comprising a predetermined cable length where the core jacket comprises a thermoplastic material comprising a memory characteristic which changes based on temperature, a set of core components, disposed within the core jacket, which comprise the predetermined length, and a strength member disposed within the core jacket intermediate the core components and the core jacket. The strength member comprises a selectively activated pre-impregnated uncured synthetic material adapted to be cured while in production, the strength member comprising a length substantially equal to the predetermined length.

20 Claims, 2 Drawing Sheets

(51) Int. Cl.
*B32B 27/32* (2006.01)
*H01B 7/04* (2006.01)

(56) References Cited

U.S. PATENT DOCUMENTS

| | | |
|---|---|---|
| 2002/0136512 A1 | 9/2002 | Dallas et al. |
| 2009/0279836 A1 | 11/2009 | De Montmorillon et al. |
| 2010/0252300 A1 | 10/2010 | Worman et al. |
| 2010/0269941 A1 | 10/2010 | Hara |
| 2011/0151235 A1 | 6/2011 | Arai et al. |
| 2012/0063731 A1 | 3/2012 | Fitz et al. |
| 2012/0129385 A1 | 5/2012 | Amato |
| 2012/0155814 A1 | 6/2012 | Leonard et al. |
| 2012/0163758 A1 | 6/2012 | McCullough et al. |
| 2012/0234596 A1 | 9/2012 | Lund |
| 2012/0237175 A1 | 9/2012 | Kachmar |

METHOD AND APPARATUS FOR CURING OF PRE IMPREGNATED SYNTHETIC COMPONENTS IN SITU

RELATION TO OTHER APPLICATIONS

This application claims the benefit of U.S. Provisional Application No. 61/722,678, entitled "Method and Apparatus For Curing of Pre Impregnated Synthetic Components In Situ" and filed on Nov. 5, 2012.

BACKGROUND

Many current cable suppliers' tether products fail. Some approaches to addressing these failures include not gluing anything with respect to a cable and its components and allowing the components to "slip" between all the layers or gluing everything and locking all the various cable components together.

If a cable's inner, core components are not configured in a manner to provide torque balance when tension is applied, these inner, core components will rotate relative to the cable's strength member and the cable's outer sheath or jacket then when linear tension is applied. As an example, this rotation may occur when all core components are cabled in the same direction, and the core, strength member, and outer sheath or jacket are not coupled. This ability for the core to rotate while manifesting no visual indication to the operator results in the core components z-kinking and failing. By "z-kinking," what is meant is that if the core is twisted and the conductors have no room to accommodate that excess, the cable inner, core components will yield, resulting in what appears to be a "z" shape. When this occurs, the cable's inner, core components, e.g. copper wiring, will fail because the cable properties have changed, and the insulation and the glass fibers will be damaged, e.g. shatter. Fluid conduits in the cable will have the flow blocked.

FIGURES

DESCRIPTION OF EMBODIMENTS

As described herein, if a cable jacket has a memory, e.g. it comprises a thermoplastic, the cable jacket may get sufficiently warm to soften the thermoplastic such as when a cable is on a ship's deck or when performing a predive procedure. When a cable as described herein is put into the water, the cable jacket may cool rapidly, causing the thermoplastic to hold a memory of the shape of a retaining device such as a storage reel or drum.

Figure 1:
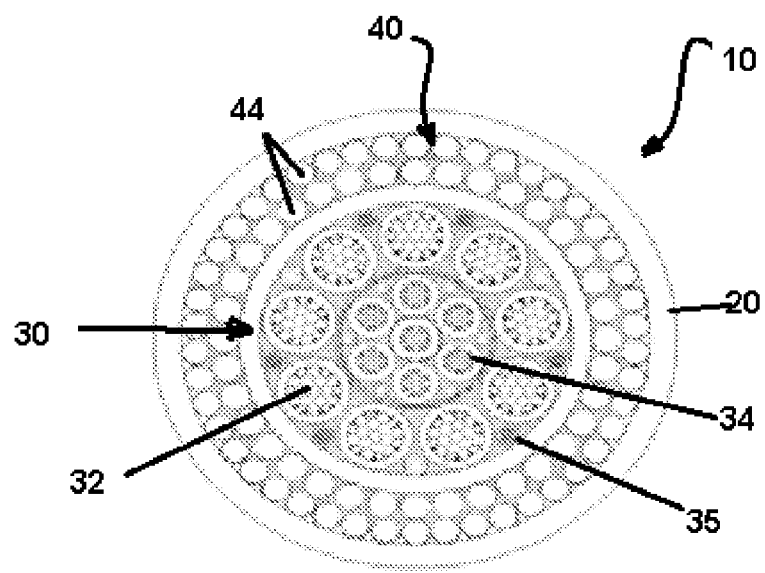
FIG. 1 is a cross-sectional view of an end of an exemplary cable.

Referring now to FIG. 1, cable 10 comprises core jacket 20; one or more core components 30 disposed within core jacket 20; and strength member 40 disposed within core jacket 20 intermediate core components 30 and core jacket 20.

Figure 2:
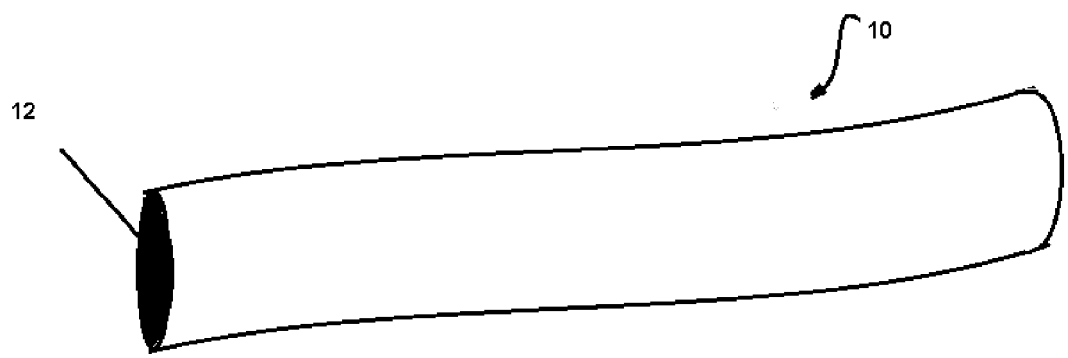
FIG. 2 is a view in partial perspective of an exemplary cable.

Cable 10 typically comprises a predetermined length, and core jacket 20, core components 30, and strength member 40 also typically comprise the same length as cable 10. In certain embodiments cable 10 further comprises splicable end 12 (FIG. 2) by which the length of cable 10 may be extended.

Cable 10 may be configured for various uses including as a tether and, in such embodiments, its design may be used for coupling cable 10 to prevent core component failures, i.e. adhering the various components as described herein below. Alternatively, cable 10 may be used as a subsea cable, hose, an umbilical, or the like. Accordingly, cable 10 may be used subsea when a subsea cable requires a strength member, as its design will allow for handling torque buildup and damage to core components 30.

Figure 3:
FIG. 3 is a view in partial perspective of an exemplary cable and cable take-up reel.

Core jacket 20, which typically comprises a length substantially equal to the desired length of cable 10, further comprises a thermoplastic material that will retain its shape when cooled and which further comprises a memory characteristic which, when at or above a predetermined temperature, increases the flexibility of core jacket 20 and below the predetermined temperature causes core jacket 20 to retain a memory of a shape of a container about which core jacket 20 was wound, e.g. storage reel 100 (FIG. 3). In embodiments, core jacket 20 compresses about core components 30 when below the predetermined temperature. The actual temperature depends on the thermoplastic material chosen, as such may each have different properties and, thus, different ranges.

Core components 30 may comprise fluid conduit 32, electrical conductor 34, fiber optics package 35, or the like, or a combination thereof.

In certain currently contemplated embodiments core jacket 20 comprises thermoplastic elastomer (TPE) and core components 30 comprise polyethylene.

Strength member 40, which typically has a length substantially equal to the predetermined length of cable 10, typically comprises selectively activated, pre-impregnated, uncured synthetic material 42 (not specifically shown in the figures), such as a heat activated glue or other material which can be impregnated into strength member 40 and achieve activation in a process to create a chemical bond, which is adapted to be cured while in production and may further comprise metal 43 (not specifically shown in the figures) and/or fiber 44 impregnated with a predetermined amount of pre-impregnated uncured synthetic material 42 sufficient to consolidate and stiffen cable 10. In most configurations, strength member 40 may comprise a yarn, nylon, or other suitable material and replaces metals such as steel as a primary strength member in cable 10. Fiber 44 may comprise a fiber such as Vectran® Strength Member Twisted and Coated manufactured by Fiber-line, Inc. of Hatfield, Pa.

Typically, the predetermined amount of pre-impregnated uncured synthetic material 42 is of an amount that will not create a chemical adhesion but, instead, will add a mechanical strength by increasing the amount of friction between fiber 44, core jacket 20, and core components 30 sufficient to only partially bond strength member 40. In this manner, the bonding is not complete, allowing a technician who is terminating cable 10, e.g. offshore, a relatively easy way to "peel" or remove strength member 40. In use though, strength member 40 will typically not separate or delaminate from cable 10.

Strength member 40 is typically locked to core jacket 20 when pre-impregnated material 42 is activated. In certain embodiments a core jacket adhesion process may be used to keep cable 10 in a helix configuration when pre-impregnated material 42 is activated. In currently contemplated embodiments one or more heating devices 130 (FIG. 4) such as heat tubes may be used for the adhesion process to transfer heat to the substrate, including using heated air like a convection oven. As illustrated generally in FIG. 4, alternative embodiments may comprise use of induction heaters, heated dies, or the like, or a combination thereof A relatively unlimited length of cable 10 is achievable as strength member 40 can be spliced, providing the ability to produce various lengths with minimal waste of strength member 40.

Figure 4:
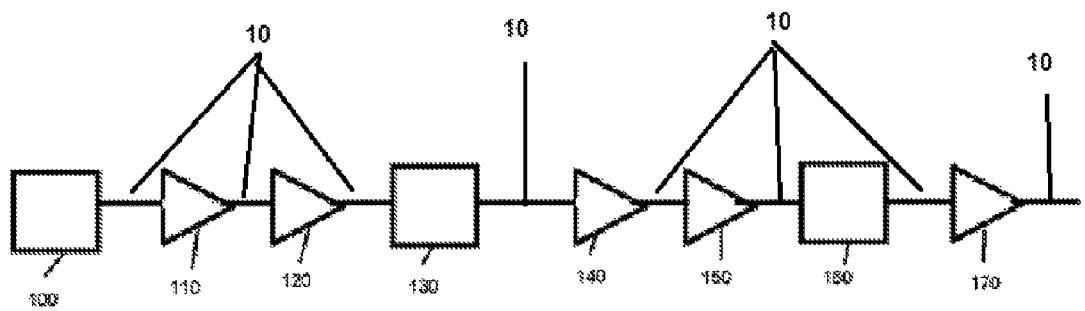
FIG. 4 is a schematic view of an exemplary manufacturing process.

Referring now to FIG. 4, in an embodiment core components 30 and strength member 40 are queued on pay off reel 100 and then fed through a processing assembly comprising Bobbin pay off 110 and server 120. The output of server 120 is then heated in curing apparatus 130 which, in embodiments, may comprise a heat tube, an induction heater, a radiation and/or light heater using UV radiation, or the like, or a combination thereof. The processed cable 10 may be then be fed to and through an additional Bobbin pay off 140 and/or server 150 and then taken up by takeup device 170 which may comprise a braider, a take up reel, or the like, or a combination thereof.

In the operation of certain embodiments, cable 10 may be constructed by assembling an inner set of core components 30 which typically comprise a length substantially equal to a desired length of cable 10; surrounding core components 30 with strength member 40, which also substantially comprises the desired length of cable 10; curing pre-impregnated uncured synthetic material 42 to a predetermined level of cure while producing cable 10; and surrounding core components 30 and the now at least partially cured pre-impregnated uncured synthetic material 42 with outer core jacket 20, the outer core jacket comprising the desired length. Core components 30, core jacket 20, and strength member 40 are as described herein above.

If pre-impregnated uncured synthetic material 42 comprises glue, curing pre-impregnated uncured synthetic material 42 may comprise using heat.

The ability to cure while in production means that there are substantially few limits on length of cable 10, e.g. splices can be made prior to curing. The coupling of core components 30, core jacket 20, and strength member 40 by an adhesion process operates to reduce the ability of core components 30 and core jacket 20 to rotate relative to strength member 40. The adhesion will also keep cable 10 and its various internal pieces in a helix shape, thus reducing effects of creep while maintain torque balance.

Strength member 40, which is described above, may comprise fiber 44 impregnated with a predetermined amount of pre-impregnated uncured synthetic material 42 sufficient to consolidate and stiffen the bundle where the predetermined amount of pre-impregnated uncured synthetic material 42 is sufficient to not create a chemical adhesion while still adding a mechanical strength by increasing the amount of friction between fiber 44, core jacket 20, and core components 30.

Success has been had using water-based adhesion promoters and polyethylene. One characteristic of a successful production is impregnating fiber 44 with the correct amount of coating, i.e. the product that is impregnated in strength member 40 which will consolidate cable 10 and make it stiffer. To ascertain a correct amount of coating for a specific set of elements a heavier coating may be tried first and then the amount of solids reduced as needed. The coating will not create a chemical adhesion but more mechanical by increasing the amount of friction between fiber 44, core jacket 20, and core components 30.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A cable, comprising:
   a. a core jacket comprising a predetermined length substantially equal to a desired cable length, the core jacket comprising a thermoplastic material, the thermoplastic material comprising a memory characteristic which, when at or above a predetermined temperature, increases flexibility of the core jacket and below the predetermined temperature causes the core jacket to retain a memory of a shape of a container about which the core jacket was wound;
   b. a core component disposed within the core jacket, the core component comprising the predetermined length; and
   c. a strength member disposed within the core jacket intermediate the core component and the core jacket, the strength member comprising a selectively activated, pre-impregnated, uncured synthetic material adapted to be cured when the cable is produced, the strength member comprising a length substantially equal to the predetermined length.

2. The cable of claim 1, wherein:
   a. the core jacket comprises thermoplastic elastomer (TPE); and
   b. the core component comprises polyethylene.

3. The cable of claim 1, further comprising a splicable end.

4. The cable of claim 1, wherein the container comprises a storage reel.

5. The cable of claim 1, wherein the core jacket compresses about the core component when below the predetermined temperature.

6. The cable of claim 1, wherein the core component comprises a fluid conduit.

7. The cable of claim 1, wherein the core component comprises an electrical conductor.

8. The cable of claim 1, wherein the strength member is locked to the core jacket when the pre-impregnated material is activated.

9. The cable of claim 1, wherein the strength member comprises a metal.

10. The cable of claim 1, wherein the cable is configured for use as at least one of a tether, subsea cable, hose, or an umbilical.

11. The cable of claim 1, wherein the pre-impregnated material comprises a chemical which, when activated, creates a chemical bond.

12. The cable of claim 11, wherein the pre-impregnated material comprises a glue.

13. The cable of claim 12, wherein the glue is activated by heat.

14. The cable of claim 1, wherein the strength member comprises a fiber impregnated with a predetermined amount of the pre-impregnated uncured synthetic material sufficient to consolidate and stiffen the cable.

15. The cable of claim 14, wherein the predetermined amount of the pre-impregnated uncured synthetic material is of an amount that will not create a chemical adhesion but, instead, adds a mechanical strength to the cable by increasing the amount of friction between the fiber, the core jacket, and the core component sufficient to only partially bond the strength member.

16. A method of constructing a cable, comprising:
a. assembling an inner set of core components, the inner set of core components comprising a length substantially equal to a desired length of a cable;
b. surrounding the inner set of core components with a strength member substantially comprising the desired length, the strength member comprising a pre-impregnated uncured synthetic material adapted to be cured during production of the cable;
c. curing the pre-impregnated uncured synthetic material to a predetermined at least partially cured level of cure while producing the cable; and
d. surrounding the inner set of core components and the now at least partially cured pre-impregnated uncured synthetic material with an outer core jacket, the outer core jacket comprising the desired length, the outer core jacket comprising a thermoplastic material, the thermoplastic material comprising a memory characteristic which, when at or above a predetermined temperature, increases flexibility of the core jacket and below the predetermined temperature causes the core jacket to retain a memory of a shape of a container about which the core jacket was wound.

17. The method of claim 16, further comprising using a strength member that comprises a fiber impregnated with a predetermined amount of the pre-impregnated uncured synthetic material sufficient to consolidate and stiffen the cable, the predetermined amount of the pre-impregnated uncured synthetic material being sufficient to not create a chemical adhesion while still adding a mechanical strength by increasing the amount of friction between the fiber, the core jacket, and the inner set of core components.

18. The method of claim 17, further comprising:
a. using a pre-impregnated uncured synthetic material that comprises a glue; and
b. curing the pre-impregnated uncured synthetic material comprises using heat.

19. The method of claim 17, further comprising using an extrusion process when surrounding the inner set of core components and the now at least partially cured pre-impregnated uncured synthetic material with an outer core jacket, the outer core jacket comprising the desired length.

20. The method of claim 17, further using a core jacket adhesion process that keeps the cable in a helix configuration when the pre-impregnated material is activated.

* * * * *